(12) United States Patent  (10) Patent No.: US 8,213,533 B2
Hafeez  (45) Date of Patent: Jul. 3, 2012

(54) DISTRIBUTED ANTENNA DIVERSITY TRANSMISSION METHOD

(75) Inventor: Abdulrauf Hafeez, Cary, NC (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 630 days.

(21) Appl. No.: 12/029,355

(22) Filed: Feb. 11, 2008

(65) Prior Publication Data

US 2009/0202020 A1    Aug. 13, 2009

(51) Int. Cl.
*H04L 27/00*    (2006.01)

(52) U.S. Cl. ........ 375/295; 370/334; 375/267; 455/103; 455/522

(58) Field of Classification Search .................. None
See application file for complete search history.

(56) References Cited

U.S. PATENT DOCUMENTS

| 2004/0023621 | A1* | 2/2004 | Sugar et al. | 455/103 |
|---|---|---|---|---|
| 2004/0198228 | A1 | 10/2004 | Raghothaman | |
| 2005/0157684 | A1 | 7/2005 | Ylitalo et al. | |
| 2005/0254477 | A1 | 11/2005 | Lee et al. | |
| 2006/0203792 | A1 | 9/2006 | Kogiantis et al. | |
| 2007/0253507 | A1 | 11/2007 | Zhou et al. | |
| 2009/0005102 | A1* | 1/2009 | Das et al. | 455/522 |

FOREIGN PATENT DOCUMENTS

| WO | 2006/103283 | 10/2006 |
|---|---|---|
| WO | 2006/113008 | 10/2006 |

OTHER PUBLICATIONS

Goeckel et al. "Space-Time Coding for Distributed Antenna Arrays." 2004 IEEE International Conference on Communications, vol. 2, Jun. 20-24, 2004, pp. 747-751.

Han et al. "Transmit Antenna Selection with Power and Rate Allocation for Generalized Distributed Wireless Communication Systems." IEEE 16th International Symposium on Personal, Indoor and Mobile Radio Communications, 2005 (PIMRC 2005), vol. 4, Sep. 11-14, 2005, pp. 2430-2434.

Tang et al. "Coded Transmit Macrodiversity: Block Space-Time Codes over Distributed Antennas." IEEE VTS 53rd Vehicular Technology Conference, 2001 (VTC 2001 Spring), vol. 2, May 6-9, 2001, pp. 1435-1438.

Zhao et al. "A Capacity-Based RAU Selection Scheme for Downlink Transmission in Distributed Antenna System." Proceedings of the 2006 International Conference on Wireless Communications and Mobile Computing, pp. 485-490.

(Continued)

*Primary Examiner* — Kevin M Burd
*Assistant Examiner* — Adolf Dsouza
(74) *Attorney, Agent, or Firm* — Coats & Bennett, P.L.L.C.

(57) ABSTRACT

A Distributed Antenna System employs a downlink transmission method that requires limited channel information feedback and less coherency between signals than is required for information broadcast. Distributed antennas are treated as diversity antennas with a given power allocation. Each antenna can transmit to multiple UEs by transmitting a weighed sum of their signals, and multiple antennas can transmit to one UE by transmitting weighed space-time (or space-frequency) coded signals. The power allocation weights are determined as an optimum power allocation policy with per-antenna power constraints.

19 Claims, 2 Drawing Sheets

OTHER PUBLICATIONS

Choi et al. "Downlink Performance and Capacity of Distributed Antenna Systems in a Multicell Environment." IEEE Transactions on Wireless Communications, vol. 6, Issue 1, Jan. 2007, pp. 69-73.

Han et al. "Transmit Antenna Selection with Power and Rate Allocation for Spatial Multiplexing in Distributed Antenna Systems." Tsinghua Science and Technology, vol. 11, No. 3, Jun. 2006, pp. 259-263.

Caire et al. "On the Achievable Throughput of a Multiantenna Gaussian Broadcast Channel." IEEE Transactions on Information Theory, vol. 49, No. 7, Jul. 2003, pp. 1691-1706.

Han et al. "Suboptimal Transmission of Orthogonal Space-Time Block Codes Over Correlated Distributed Antennas." IEEE Signal Processing Letters, vol. 14, No. 2, Feb. 2007, pp. 89-92.

Toufik et al., "Multiuser Channel Allocation Algorithms Achieving Hard Fairness," Globcomm 2004, Nov. 29-Dec. 3, 2004, pp. 146-150, IEEE Communications Society, Piscataway, NJ, US.

Toufik et al., "Wideband Channel Allocation in Distributed Antenna Systems," Vehicular Technology Conference 2006, Sep. 2006, pp. 1-5, IEEE, Piscataway, NJ, US.

* cited by examiner

DISTRIBUTED ANTENNA DIVERSITY TRANSMISSION METHOD

FIELD OF THE INVENTION

The present invention relates generally to wireless communication systems and in particular, to a distributed antenna diversity transmission method and a corresponding resource allocation scheme for a distributed antenna system.

BACKGROUND

A Distributed Antenna System (DAS) consists of antennas (or antenna arrays) spatially distributed in a geographical location and connected to a central processing unit (CPU) via backhaul. The CPU coordinates transmissions to all user equipments (UEs) in the geographical location via the distributed antennas. It has been shown that a DAS can achieve high user and sum throughputs in the downlink by broadcasting information to several UEs in the service area. This is described in a paper by G. Caire and S. Shamai, "On the achievable throughput of a multiantenna Gaussian broadcast channel," published in the IEEE Trans. Info. Theory, vol. 49, no. 7, pp. 1691-1706, July 2003, and incorporated herein by reference.

Information broadcast as described in the above-referenced paper requires reasonably accurate knowledge of the propagation channels between all distributed antennas and all UEs involved in the broadcast. In a time division duplex (TDD) system, this knowledge can be acquired from the uplink channels. However, in a frequency division duplex (FDD) system, this knowledge has to be fed back from the UEs to the base antennas via feedback channels, which taxes the system capacity. Another problem is that information broadcast requires signal transmission from distributed antennas to be highly coherent. The scheme is not very robust against channel estimation errors, feedback delay and system synchronization errors.

SUMMARY

According to one or more embodiments of the present invention, a downlink transmission method requires limited channel information feedback, and less coherency between signals transmitted from base antennas than information broadcast. According to one or more embodiments, the distributed antennas are treated as diversity antennas with a given power allocation. Each base antenna can transmit to multiple UEs by simply transmitting a weighed sum of their signals and multiple base antennas can transmit to one UE by transmitting weighed space-time coded signals. The weights are determined by applying an optimum power allocation policy with per-antenna power constraints.

Space-time coded transmission to a single user over distributed antennas is known in the art. See, Y. Tang and M. C. Valenti, "Coded transmit macrodiversity: block spacetime codes over distributed antennas," IEEE VTC Spring, pp. 1435-1438, 2001; S. Han, S. Zhou, J. Wang and W. Park, "Transmit antenna selection with power and rate allocation for generalized distributed wireless communication systems: IEEE PIMRC, pp. 2430-2434, 2005; and S. Han, S. Zhou, J. Wang, V. O. K. Li and K. Park, "Suboptimal transmission of orthogonal space-time block codes over correlated distributed antennas," IEEE Trans. Sig. Proc. Letters, vol. 14, no. 2, pp. 89-92, February 2007, all of which are incorporated herein by reference. According to one or more embodiments space-time coded signals are transmitted to multiple users.

The multi-user case is fundamentally different from the single-user case because of mutual interference between multi-user signals. As a result of this, power allocation weights designed for a single-user system are not recommended for a multi-user system.

DETAILED DESCRIPTION

Figure 1:
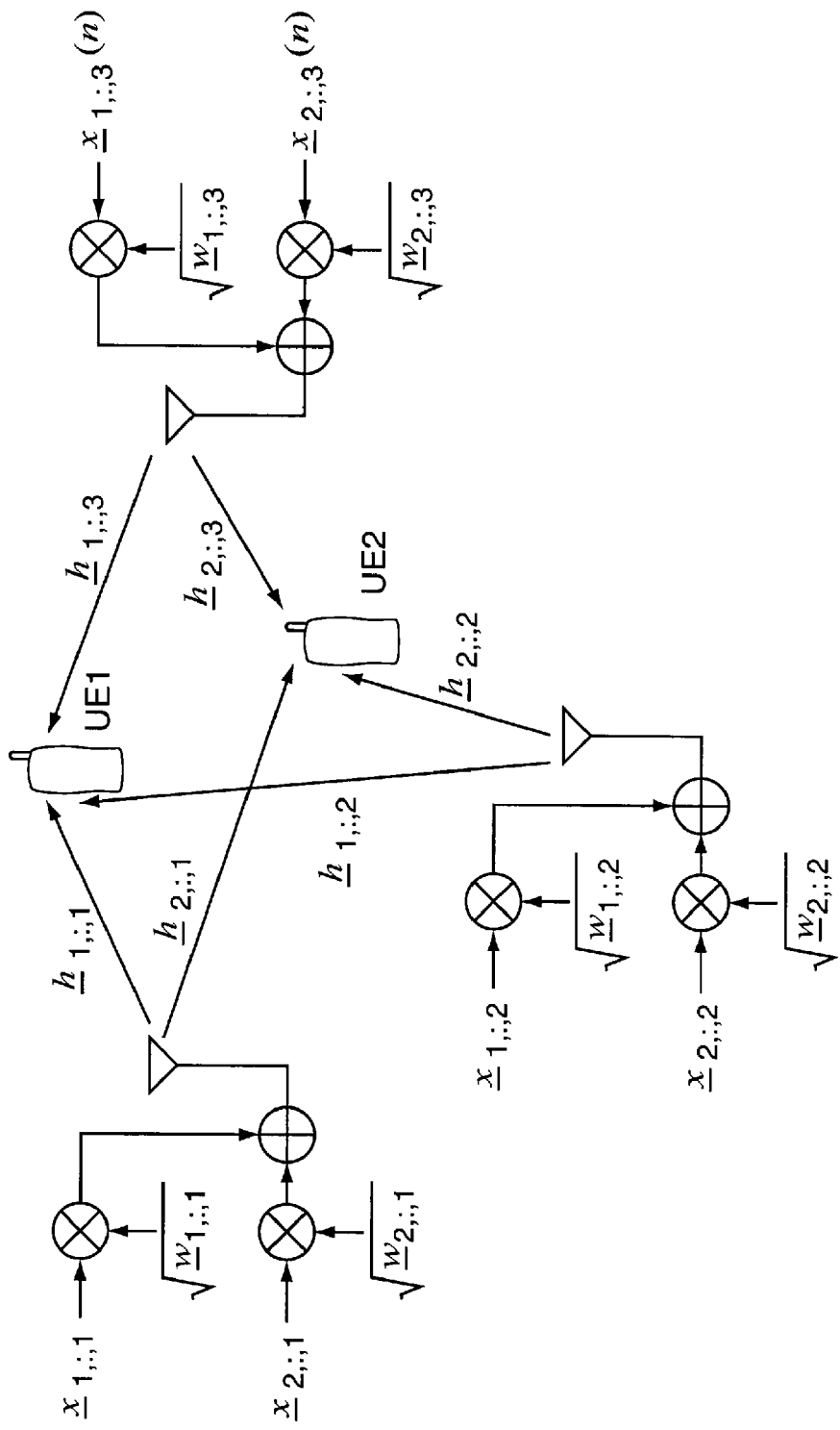
FIG. 1 is a functional block diagram of a Distributed Antenna System transmitting signals to two User Equipments from three base antennas.

FIG. 1 depicts a Distributed Antenna System (DAS) with M=3 distributed base antennas and K=2 UEs with L independent flat-fading channels (frequency chunks or time slots) comprising the propagation medium between each base antenna and each UE. The baseband received signal at the receiver of UE k for channel l can be written as $$y_{k,l}(n) = \sum_{m=1}^{M} \sqrt{w_{k,l,m}} \, h_{k,l,m} x_{k,l,m}(n) + \sum_{i \neq k} \sum_{m=1}^{M} \sqrt{w_{i,l,m}} \, h_{i,l,m} x_{i,l,m}(n) + z_{k,l}(n)$$

where $h_{k,l,m}$ and $x_{i,l,m}(n)$ are the impulse response coefficient and the transmitted symbol for time n, respectively, for the l-th channel between UE k and base antenna m, and $z_{k,l}(n)$ is a sample of white Gaussian noise with zero mean and unit variance for UE k and channel l. In the above equation, $w_{k,l,m}$ is a power allocation weight for the l-th channel between UE k and base antenna m. A full-rate and full-diversity space-time (or space-frequency) code is employed to transmit information from all distributed antennas (with nonzero power allocation weights) to each UE on each channel. For example, in the case where there are only two distributed antennas m1 and m2 with nonzero weights for transmission to UE k on channel l, the transmitted symbols can be selected according to the Alamouti code as $$\underline{x}_{k,l,m1} = [s_{k,l}(1), s_{k,l}(2), s_{k,l}(3), s_{k,l}(4), \ldots] \text{ and}$$
$$\underline{x}_{k,l,m2} = [-s^*_{k,l}(2), s^*_{k,l}(1), -s^*_{k,l}(4), s^*_{k,l}(3), \ldots],$$

where $s_{k,l}(n)$ are channel-coded information symbols for UE k's l-th channel.

It is assumed that the receiver of each UE knows its own channel impulse response coefficients and power allocation weights. The receiver decodes its space-time code blocks using the knowledge of these channel impulse response coefficients and power allocation weights. The signal-to-interference-plus-noise ratio (SINR) at the receiver of UE k for channel l is given by $$SINR_{k,l} = \frac{\sum_{m=1}^{M} w_{k,l,m} p_{k,l,m}}{1 + \sum_{i \neq k} \sum_{m=1}^{M} w_{i,l,m} p_{i,l,m}}$$

where $p_{k,l,m}=|h_{k,l,m}|^2$. The information rate in bits/s/Hz that can be allocated to UE k is therefore given by $$\sum_{l=1}^{L} R_{k,l}(w_{k,l,m}) = \sum_{l=1}^{L} \log\left(1 + \frac{\sum_{m=1}^{M} w_{k,l,m} p_{k,l,m}}{1 + \sum_{i \neq k} \sum_{m=1}^{M} w_{i,l,m} p_{i,l,m}}\right)$$

Next, we describe how power allocation weights may be designed. One criterion is to maximize the sum UE rate. However, this generally results in highly unfair rate allocation amongst UEs. A highly desirable criterion in terms of fairness is to maximize the minimum UE rate. A sum power constraint on the base antennas has widely been used in the literature for DAS. However, this constraint is unrealistic since the antennas are not co-located. Thus, we consider maximization of the minimum UE rate under per-antenna power constraints as described below.

The weights are designed on the basis of the criterion:

$$\max_{w_{k,l,m}} \min_k \sum_{l=1}^{L} R_{k,l}(w_{k,l,m}) \quad (1)$$

such that the constraints $$\sum_{k=1}^{K} \sum_{l=1}^{L} w_{k,l,m} = 1 \, \forall \, m$$

and $$w_{k,l,m} \geq 0 \, \forall k,l,m$$

are satisfied. In general, the above problem is not a convex optimization problem. However, for the special case of L=1, the problem becomes convex as shown as follows. It can be observed that for L=1 (say for channel 0), we have $$R_{k,0}(w_{k,0,m}) = -\log\left(1 - \frac{\sum_{m=1}^{M} w_{k,0,m} p_{k,0,m}}{1 + \sum_{i=1}^{K} \sum_{m=1}^{M} w_{i,0,m} p_{i,0,m}}\right).$$

The optimization problem in eq. (1) can therefore be stated as $$\max_{w_{k,0,m}} \frac{\left(\min_k \sum_{m=1}^{M} w_{k,0,m} p_{k,0,m}\right)}{1 + \sum_{i=1}^{K} \sum_{m=1}^{M} w_{i,0,m} p_{i,0,m}} \quad (2)$$

such that the constraints $$\sum_{k=1}^{K} w_{k,0,m} = 1 \, \forall \, m$$

and $$w_{k,0,m} \geq 0 \, \forall k,m$$

are satisfied.

It can be shown that the above problem is equivalent to $$\max_{w_{k,0,m}} \min_k \sum_{m=1}^{M} w_{k,0,m} p_{k,0,m} \quad (3)$$

such that the constraints $$\sum_{k=1}^{K} w_{k,0,m} = 1 \, \forall \, m$$

and $$w_{k,0,m} \geq 0 \, \forall k,m$$

are satisfied.

Since the minimum of an affine expression is concave, the problem becomes that of maximization of a concave expression which can be solved readily by means of a convex optimization tool such as CVX. In the case of L>1, one can use a general optimization tool to find at least a local maxima.

In one embodiment, the UEs feedback the instantaneous channel powers $p_{k,l,m}$ to the base antennas. The base antennas forward this information to the CPU via backhaul. The CPU determines power allocation weights $w_{k,l,m}$ according to an optimization criterion such as maximizing the minimum UE rate under per-antenna power constraints. The relevant weight and rate information ($w_{k,l,m}$, $R_{k,l}$) is provided to each base antenna and each UE. Using appropriately-dimensioned space-time or space-frequency codes, the base antennas transmit independent data streams of given information rates to all UEs after weighing the signals according to the weight information. The receiver in each UE decodes the space-time or space-frequency code by using an estimate of the channel impulse response coefficients and the weight information.

In another embodiment, the UEs feedback the average received signal powers $\bar{p}_{k,m}=E_h[p_{k,l,m}]$ to the base antennas. The base antennas forward this information to the CPU via backhaul. The CPU determines power allocation weights $w_{k,m}$ according to an optimization criterion such as that maximizing the minimum UE average SINR under per-antenna power constraints. The average SINR for the k-th UE is defined as $$\overline{SINR}_k = \frac{\sum_{m=1}^{M} w_{k,m} \bar{p}_{k,m}}{1 + \sum_{i \neq k} \sum_{m=1}^{M} w_{i,m} \bar{p}_{i,m}}$$

Note that the above optimization problem is the same as maximizing the minimum UE rate for known instantaneous channel powers for L=1 (eq. (3)). A convex optimization tool can thus be used to find the weights at the CPU. The relevant weight information is provided to each base antenna and each UE. The UE then estimates the channel impulse response coefficients for each base antenna with non-zero weights. The instantaneous channel powers for these antennas are fed back to the corresponding antennas and from there on to the CPU. Using the instantaneous channel power information, the CPU determines the information rates $R_{k,l}$ that may be allocated to the channels of each UE. The rate information is passed on to the base antennas. Using appropriately-dimensioned space-time or space-frequency codes, the base antennas transmit independent data streams of given information rates to all UEs after weighing their signals according to the weight Information. The receiver in each UE decodes the space-time or space-frequency code by using an estimate of its channel impulse response coefficients and its weight information.

Since the weight matrix is generally sparse, only a few base antennas have positive weights for each UE. Thus, the amount of channel information feedback required in the second embodiment of the present invention is significantly less than the first embodiment. Note that instead of feeding back the instantaneous channel information of each base antenna with non-zero weights, the UE can feed back the desired rates based on the channel information.

In a practical DAS, signals transmitted from many base antennas may be received at each UE. Some of these signals may be received with very low power. It would be apparent to those skilled in the art that such signals may be considered as part of thermal noise. This means that each UE may have a different noise variance. However, the received signal may be scaled with the inverse square root of this variance so as to make the noise variance unity at each UE.

Figure 2:
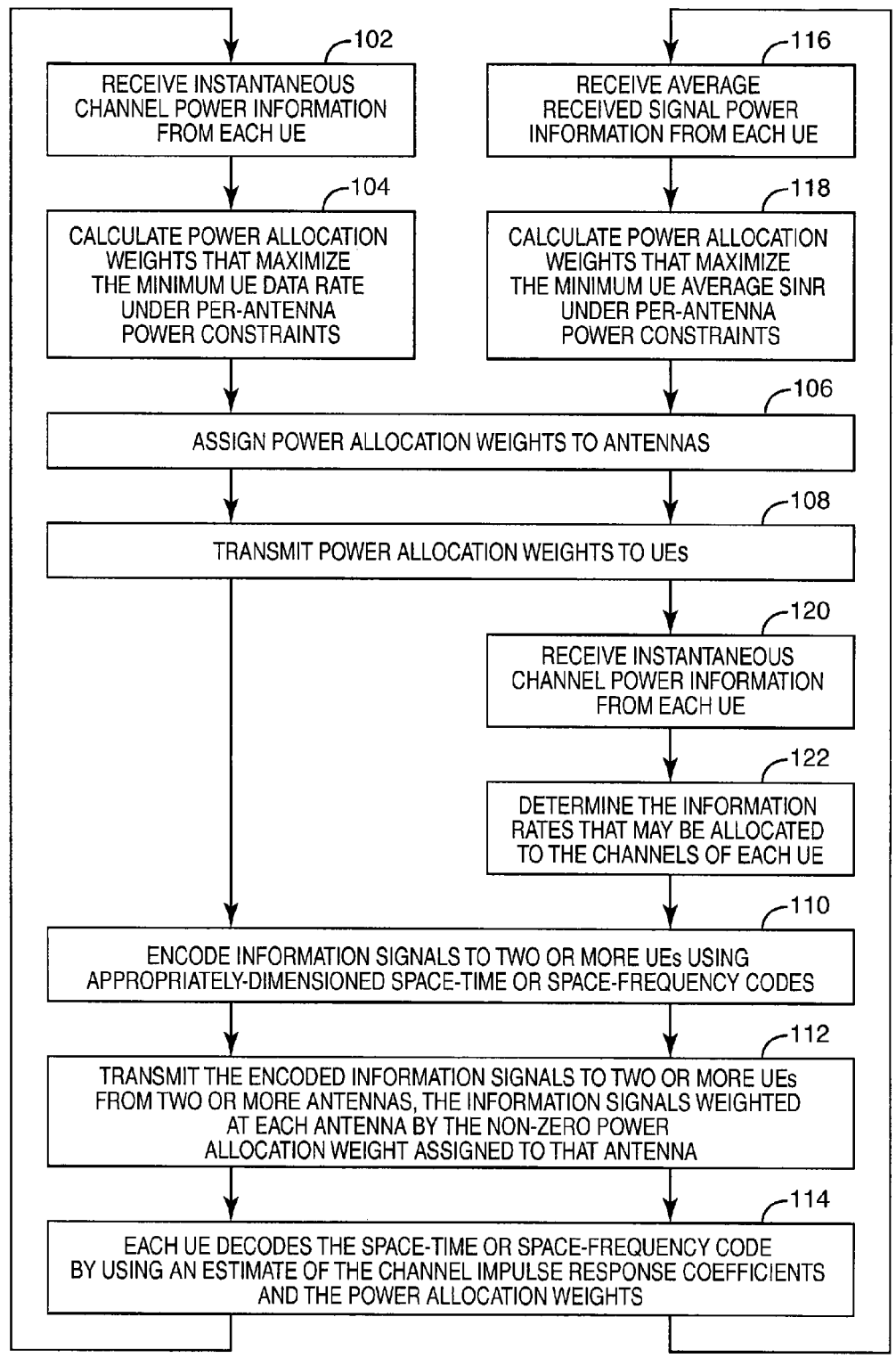
FIG. 2 is a flow diagram of two embodiments of a method of transmitting information signals to two or more User Equipments from a Distributed Antenna System (the embodiments having common method steps).

FIG. 2 depicts two embodiments of a method 100 of transmitting information signals to two or more UE from a DAS. The first embodiment, as described above, is depicted by the left-hand flow in FIG. 2; the second embodiment described above is depicted by the right-hand flow. Those of skill in the art will recognize that the steps of the method 100 according to either embodiment are ongoing and continuous. However, the first embodiment of the method 100 may be said to "begin" when the antennas of the DAS receive instantaneous channel power information from each UE (block 102). The antennas transmit the instantaneous channel power information to a CPU, which calculates power allocation weights that maximize the minimum UE data rate under per-antenna power constraints (block 104). The CPU assigns the power allocation weights to the antennas (block 106), which transmit the weights to the UEs (block 108). The DAS encodes information signals directed to two or more UEs using appropriately-dimensioned (in this embodiment, full-rate and full-diversity) space-time or space-frequency codes (block 110). The DAS then transmits the encoded information signals to two or more UEs from two or more antennas, the information signals weighted at each antenna by the non-zero power allocation weight assigned to that antenna (block 112). A receiver in each UE decodes the space-time or space-frequency code using an estimate of the channel impulse response coefficients and the antennas' assigned power allocation weights (block 114). The method 100 then repeats.

A second embodiment of the method 100 "begins" when the antennas of the DAS receive average received signal power information from each UE (block 116). The antennas transmit the average received signal power information to the CPU, which calculates power allocation weights that maximize the minimum UE average SINR under per-antenna power constraints (block 118). The CPU assigns the power allocation weights to the antennas (block 106), which transmit the weights to the UEs (block 108). The DAS then receives instantaneous channel power information from each UE (block 120). The antennas transmit the instantaneous channel power information to the CPU, which determines the information rates that may be allocated to the channels of each UE (block 122). The DAS encodes information signals directed to two or more UEs using appropriately-dimensioned space-time or space-frequency codes at the determined rate (block 110). The DAS then transmits the encoded information signals to two or more UEs from two or more antennas, the information signals weighted at each antenna by the non-zero power allocation weight assigned to that antenna (block 112). A receiver in each UE decodes the space-time or space-frequency code using an estimate of the channel impulse response coefficients and the antennas' assigned power allocation weights (block 114). The method 100 then repeats.

The diversity transmission scheme according to embodiments of the present invention is advantageously employed in the downlink of a distributed antenna system. In one embodiment, instantaneous channel powers are fed back to the base antennas. In another embodiment, average channel powers for all antennas and instantaneous powers of a few antennas are fed back. In either embodiment, considerably less channel information feedback is required than for information broadcast. In the present invention, space-time codes that do not require coherent transmission from distributed antennas can be used. These are described in a paper by D. Goeckel and Y. Hao, "Space-time coding for distributed antenna arrays," published in IEEE ICC, pp. 747-751, 2004, and incorporated herein by reference. In contrast, dirty paper codes used in information broadcast require coherent transmission.

Embodiments of the present invention combine the benefits of macro- and micro-diversity. Macro-diversity is provided by distributed antennas and helps to counter the effects of path loss and shadowing. Micro-diversity is provided by space-time coding which helps to mitigate the effects of multipath fading.

Power allocation weights for the distributed antennas are designed to maximize the minimum user information rate under per-antenna power constraints. This results in a fair resource allocation amongst users with a practical constraint. It has been shown that the scheme performs much better than equal power allocation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting information signals to two or more User Equipment (UE) from a Distributed Antenna System comprising a plurality of geographically distributed, non-co-located antennas, each connected to a central CPU via backhaul, the method comprising:
   assigning a non-zero power allocation weight to each of two or more geographically distributed, non-co-located antennas using power allocation weights that maximize one of the minimum UE information rate or minimum UE average Signal to Interference and Noise Ratio (SINR), under per-antenna power constraints;
   encoding information signals to two or more UEs using a space-time or space-frequency code; and
   transmitting the encoded information signals to each of the two or more UEs from each of the two or more geographically distributed, non-co-located antennas, the information signals weighted at each antenna by the non-zero power allocation weight assigned to that antenna.

2. The method of claim 1 wherein assigning a non-zero power allocation weight to each of two or more antennas comprises calculating power allocation weights that maximize the minimum UE information rate under per-antenna power constraints.

3. The method of claim 2 further comprising receiving instantaneous channel power information from each UE, and calculating power allocation weights in response to the instantaneous channel power information.

4. The method of claim 3 further comprising transmitting to each UE the calculated non-zero power allocation weight of each antenna and the UE information rate.

5. The method of claim 4 further comprising decoding, in each UE, the space-time or space-frequency code by using an estimate of the channel impulse response coefficients and the weight information.

6. The method of claim 2 wherein the non-zero power allocation weights are selected on the basis of the criterion $$\max_{w_{k,l,m}} \min_k \sum_{l=1}^{L} R_{k,l}(w_{k,l,m})$$

such that the constraints $$\sum_{k=1}^{K} \sum_{l=1}^{L} w_{k,l,m} = 1 \ \forall \ m$$

and $w_{k,l,m} \geq 0 \forall k,l,m$ are satisfied, where m is the antenna index, k is the UE index, l is the index of the independent flat-fading channel comprising the propagation medium between each antenna and each UE, $w_{k,l,m}$ is the power allocation weight for the l-th channel between UE k and antenna m, and $R_{k,l}(w_{k,l,m})$ is the information rate in bits/s/Hz that can be allocated to UE k.

7. The method of claim 6 wherein L=1, and the non-zero power allocation weights are selected on the basis of the criterion $$\max_{w_{k,0,m}} \frac{\left(\min_k \sum_{m=1}^{M} w_{k,0,m} \overline{p}_{k,0,m}\right)}{1 + \sum_{i=1}^{K} \sum_{m=1}^{M} w_{i,0,m} p_{i,0,m}}$$

such that the constraints $$\sum_{k=1}^{K} w_{k,0,m} = 1 \ \forall \ m$$

and $w_{k,0,m} \geq 0 \forall k,m$ are satisfied, where $p_{k,l,m}$ is the instantaneous channel power reported by UE k to antenna m for the single channel l=0.

8. The method of claim 7 wherein the non-zero power allocation weights are selected on the basis of the equivalent criterion $$\max_{w_{k,0,m}} \min_k \sum_{m=1}^{M} w_{k,0,m} p_{k,0,m}$$

such that the constraints $$\sum_{k=1}^{K} w_{k,0,m} = 1 \ \forall \ m$$

and $w_{k,0,m} \geq 0 \forall k,m$ are satisfied.

9. The method of claim 1 wherein assigning a non-zero power allocation weight to each of two or more antennas comprises calculating power allocation weights that maximize the minimum UE average SINR under per-antenna power constraints.

10. The method of claim 9 further comprising receiving average received signal power information from each UE, and calculating power allocation weights in response to the average received signal power information.

11. The method of claim 9 further comprising:
transmitting to each UE the calculated non-zero power allocation weight of each antenna;
receiving from each UE estimates of the channel impulse response coefficients for each antenna with non-zero power allocation weights; and
determining the information rates that may be allocated to the channels of each UE in response to the instantaneous channel power information; and
wherein encoding information signals to two or more UEs comprises encoding the information signals using appropriately-dimensioned space-time or space-frequency codes at the determined information rates.

12. The method of claim 11 further comprising decoding, in each UE, the space-time or space-frequency code by using an estimate of the channel impulse response coefficients and the weight information.

13. The method of claim 9 wherein the average SINR for the k-th UE is $$\overline{SINR}_k = \frac{\sum_{m=1}^{M} w_{k,m} \overline{p}_{k,m}}{1 + \sum_{i \neq k} \sum_{m=1}^{M} w_{i,m} \overline{p}_{i,m}}$$

where
m is the antenna index,
k is the UE index,
$w_{k,m}$ is the power allocation weight between UE k and antenna m, and
$\overline{p}_{k,m} = E_h[p_{k,l,m}]$ is the average signal power received by the k-th UE from the antenna m.

14. A Distributed Antenna System (DAS), comprising:
a plurality of geographically distributed, non-co-located antennas, each operative to transmit independent, power-weighted, space-time or space-frequency encoded signals to a plurality of User Equipment (UE); and a controller in data transfer relationship with the plurality of antennas across a backhaul, the controller operative to calculate power allocation weights for each antenna that maximize one of the minimum UE data rate and the minimum UE average Signal to Interference and Noise Ratio (SINR), with per-antenna power constraints.

15. The DAS of claim 14 wherein the antennas are each further operative to transmit their respective power allocation weights to the plurality of UE.

16. The DAS of claim 14, wherein the controller is operative to calculate power allocation weights that maximize the minimum UE data rate under per-antenna power constraints.

17. The DAS of claim 16, wherein the controller receives instantaneous channel power information from each UE, and calculates the power allocation weights in response to the instantaneous channel power information.

18. The DAS of claim 14, wherein the controller is operative to calculate power allocation weights that maximize the minimum UE average SINR under per-antenna power constraints.

19. The DAS of claim 18, wherein the controller receives average received signal power information from each UE, and calculates the power allocation weights in response to the average received signal power information.

* * * * *